(12) United States Patent
Vissenberg et al.

(10) Patent No.: US 9,097,824 B2
(45) Date of Patent: Aug. 4, 2015

(54) LIGHT MIXING MODULE, AND A LUMINAIRE COMPRISING SUCH A LIGHT MIXING MODULE

(75) Inventors: Michel Cornelis Josephus Marie Vissenberg, Roermond (NL); Tim Dekker, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 381 days.

(21) Appl. No.: 13/583,650

(22) PCT Filed: Mar. 10, 2011

(86) PCT No.: PCT/IB2011/051009
§ 371 (c)(1),
(2), (4) Date: Sep. 10, 2012

(87) PCT Pub. No.: WO2011/114265
PCT Pub. Date: Sep. 22, 2011

(65) Prior Publication Data
US 2013/0003409 A1    Jan. 3, 2013

(30) Foreign Application Priority Data

Mar. 18, 2010   (EP) ..................................... 10156909

(51) Int. Cl.
F21V 7/04      (2006.01)
F21V 8/00      (2006.01)

(52) U.S. Cl.
CPC ............ G02B 6/0018 (2013.01); *G02B 6/0068* (2013.01); *G02B 6/0073* (2013.01)

(58) Field of Classification Search
CPC .. G02B 6/0038; G02B 6/0053; G02B 6/0036; G02B 6/0068; G02B 6/0061
USPC ......... 362/606, 249, 235, 252, 800, 326, 335, 362/244, 230, 231, 246
See application file for complete search history.

(56) References Cited

U.S. PATENT DOCUMENTS 4,450,513 A   5/1984  Guggemos
5,055,978 A   10/1991 Rogoff
(Continued)

FOREIGN PATENT DOCUMENTS

CN      1700067 A    11/2005
CN    201386961 Y     1/2010
(Continued)

*Primary Examiner* — Joseph L Williams
(74) *Attorney, Agent, or Firm* — Meenakshy Chakravorty

(57) ABSTRACT

A light mixing module (3) for receiving light from a first set of light sources (4) and a second set of light sources (5), said light mixing module comprising: —an annular light guiding element (11), said annular light guiding element having an inner edge (13), a peripheral edge (12), a first intermediate surface (15) extending between said inner and peripheral edges and arranged to face said light sources, and a second intermediate surface (16) extending between said inner and peripheral edges opposite said first intermediate surface, wherein said inner edge (13) defines a cavity (18) with an opening arranged to face said light sources, wherein said opening is arranged to receive light from said first set of light sources (4) and said first intermediate surface (15) is arranged to receive light from said second set of light sources (5); and —a first reflective surface (17) arranged to close said cavity in an end opposite said opening so as to form a first mixing chamber (18), wherein said annular light guiding element (11) and said first reflective surface (17) is arranged in such a way that light entering via said opening is mixed in said first mixing chamber (18), coupled into said annular light guiding element (11) through said inner edge (13), guided through the annular light guiding element (11) in a radial direction by means of total internal reflection and coupled out through the peripheral edge (12), and light received by said first intermediate surface (15) is guided through said light guiding element (11) by means of total internal reflection and out-coupled through said second intermediate surface (16).

13 Claims, 3 Drawing Sheets

(56) References Cited

U.S. PATENT DOCUMENTS

| | | |
|---|---|---|
| 6,250,774 B1 | 6/2001 | Begemann et al. |
| 6,256,447 B1 | 7/2001 | Laine |
| 6,454,437 B1 | 9/2002 | Kelly |
| 7,534,013 B1 | 5/2009 | Simon |

FOREIGN PATENT DOCUMENTS

| | | |
|---|---|---|
| JP | 2000003608 A1 | 1/2000 |
| WO | 2008047278 A2 | 4/2008 |
| WO | 2009105168 A2 | 8/2009 |

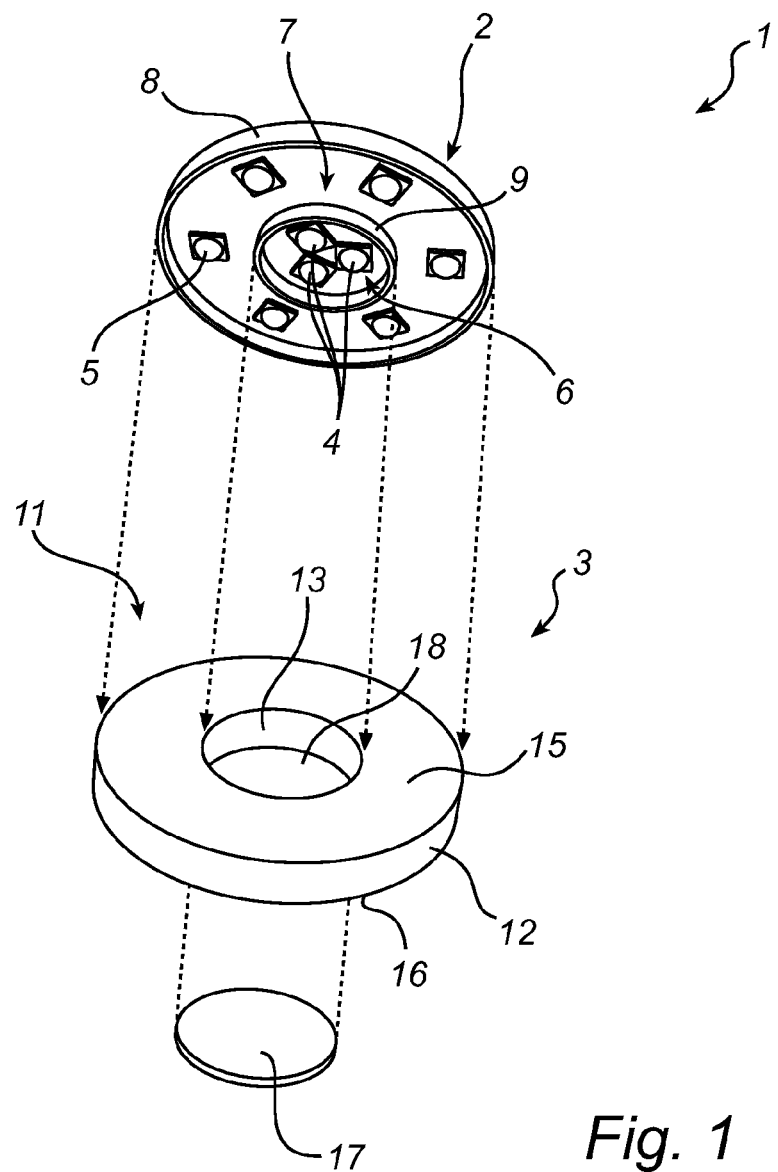
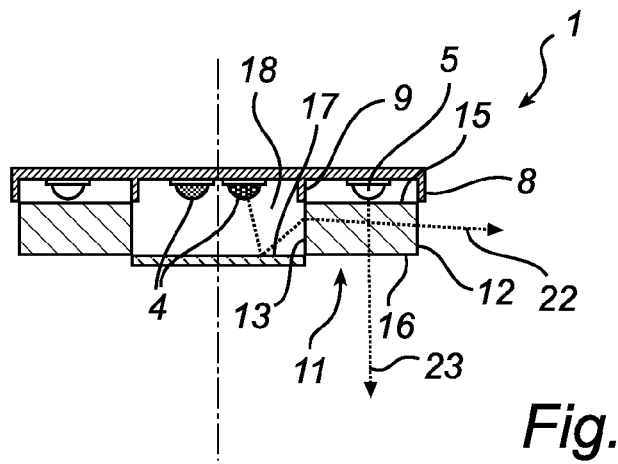
Fig. 1
Fig. 2

LIGHT MIXING MODULE, AND A LUMINAIRE COMPRISING SUCH A LIGHT MIXING MODULE

FIELD OF THE INVENTION

The present invention relates to a light mixing module. The present invention also relates to a luminaire comprising such a light mixing module.

BACKGROUND OF THE INVENTION

Progress in the brightness, lumen efficacy and affordability of solid state light sources, such as light emitting diodes (LEDs), enables new lighting applications that are no longer restricted to niche markets. LEDs offer several advantages over traditional light sources, such as long life time, low operating voltage, small form factor (giving design flexibility), almost pure spectral colors, fast modulation of lumen output, instant on, etc. For these and other reasons, LEDs are becoming more and more suited for making lamps for a variety of applications such as color variable luminaires, spotlights, architectural lighting, stage lighting, etc.

For example, it is increasingly popular to provide luminaires where the user can create various atmospheres according to his wishes. This has lead to development of dual function lamps that e.g. may provide white task light directed downwards, and colored atmosphere light directed upwards in a single lamp.

Previously known dual function lamps comprise two stacked sub-systems: at the bottom a side-emitting LED source with white LEDs and optics to send the light down; at the top a side-emitting LED source with colored LEDs and optics to send the light up. Such a dual function lamp is known from WO2008047278 by the same applicant disclosing a luminaire comprising an upper light guiding layer and a lower light guiding layer, wherein a colored side-emitting LED source is accommodated in a circular opening in the upper light guiding layer for emitting light into the upper light guiding layer, and a white side-emitting LED source is accommodated in a circular opening in the lower light guiding layer for emitting light into the lower light guiding layer. The light from the upper light guiding layer is outcoupled upwards to provide colored atmosphere light, while the light from the lower light guiding layer is outcoupled downwards to provide white task light.

However, this arrangement requires two LED sources arranged in separate locations, i.e. one LED source containing the white LEDs for arrangement in the lower light guiding layer, and one LED source containing the colored LEDs for arrangement in the upper light guiding layer. In order to provide a luminaire at reduced cost it would be desirable to be able to arrange the white LEDs and the colored LEDs together.

SUMMARY OF THE INVENTION

It is an object of the present invention to overcome this problem, and to enable a dual function luminaire at a reduced cost. In particular, an object is to enable a dual function luminaire where all light sources can be arranged together.

According to an aspect of the invention, this and other objects are achieved by a light mixing module for receiving light from a first set of light sources and a second set of light sources, the light mixing module comprising: an annular light guiding element, the annular light guiding element having an inner edge, a peripheral edge, a first intermediate surface extending between the inner and peripheral edges and arranged to face the light sources, and a second intermediate surface extending between the inner and peripheral edges opposite the first intermediate surface, wherein the inner edge defines a cavity with an opening arranged to face the light sources, wherein the opening is arranged to receive light from the first set of light sources and the first intermediate surface is arranged to receive light from the second set of light sources, and a first reflective surface arranged to close the cavity in an end opposite the opening so as to form a first mixing chamber, wherein the annular light guiding element and the first reflective surface is arranged in such a way that light entering via the opening is mixed in the first mixing chamber, coupled into the annular light guiding element through the inner edge, guided through the annular light guiding element in a radial direction by means of total internal reflection and coupled out through the peripheral edge, and light received by the first intermediate surface is guided through the light guiding element by means of total internal reflection and out-coupled through the second intermediate surface.

It is to be understood that a set of light sources may be a single light source or a plurality of light sources.

The present invention is based on the understanding that the annular light guiding element in the light mixing module allows the light from the first set of light sources to cross light from the second set of light sources without cross-talk. This leads to new possibilities when it comes to placement of the first and second set of light sources, and thereby enables a dual function luminaire at a reduced cost. Furthermore, when the first set of light sources includes a plurality of small point light sources, such as light emitting diodes (LEDs), the first mixing chamber can reduce LED brightness and visibility of individual LEDs. This allows color mixing as well as a variation in the number, bin and even type of LEDs in the same product range.

The annular light guiding element may preferably be transparent and can be made of e.g. glass or plastics, but can be made of any other material suitable for guiding light by total internal reflection. The medium surrounding the annular light guiding element may typically be air, but other materials having a sufficiently low refractive index to guarantee total internal reflection may also be utilized such as a gel or cladding material known from optical fibers. The annular light guiding element may typically have a refractive index that exceeds $\sqrt{2}$.

The inner edge of the annular light guiding element may preferably be essentially perpendicular to the first intermediate surface of the annular light guiding element and to the second intermediate surface of the annular light guiding element. Furthermore, the first intermediate surface may preferably be essentially perpendicular to the inner edge of the annular light guiding element and to the peripheral edge of the annular light guiding element.

According to Snell's law, the light is bent to the normal of the entrance surface, when entering the annular light guiding element. As a result, all entering light will be within a cone to this normal. For example, for a material with a refractive index 1.5, surrounded by air, all light is within a cone of 42 degrees to this normal. This means that for an annular light guiding element with a refractive index that exceeds $\sqrt{2}$, all perpendicular surfaces will give an angle of incidence larger than the critical angle for total internal reflection (TIR). Thus, by having the light guiding surfaces of the annular light guiding element arranged at an essentially perpendicular orientation relative the incoupling surfaces, it is possible to ensure total internal reflection both for light guided in the radial direction and for light guided in the axial direction. Consequently, light from the first set of light sources and light from the second set of light sources can be kept separate from one another, so that cross-talk between light from the first set of light sources and light from the second set of light sources can be minimized. As is recognized by a person skilled in the art, the surfaces of the annular light guiding element can somewhat deviate (typically with a few degrees) from their perpendicular orientation, if a material with a relatively high refractive index is used for the annular light guiding element. This also means that, instead of using flat light guiding surfaces, the light guiding surfaces may be slightly bent without light leakage.

At least one of the surfaces of the annular light guiding element may be provided with diffusing means in order to improve the light mixing effect. The diffusing means may e.g. be a diffuser foil arranged at the surface and/or a set of grooves (or lenticular facets) in the surface of the annular light guiding element. To prevent that the grooves break up the TIR, the grooves may extend along the main direction of the light guided by TIR. Thus, any grooves on the inner and outer edge may have an axial extension, whereas any grooves on the first and second intermediate surfaces may have a radial extension.

An area of the inner edge of the annular light guiding element may preferably be at least as large as an area of the first reflective surface. This reduces the average number of reflections needed inside the first mixing chamber before light can escape into the annular light guiding element, and thus reduces the amount of light lost by absorption.

The annular light guiding element may preferably be circular symmetric about its longitudinal axis to provide a uniform light distribution. However, the annular light guiding element may also have any other suitable shape. For example, the opening and/or the periphery of the annular light guiding element may have a rectangular, hexagonal, or octagonal shape.

The light mixing module according to the present invention may advantageously be included in a luminaire, further comprising a first set of light sources arranged to emit light that is received by the opening in the annular light guiding element; and a second set of light sources arranged to emit light that is received by the first intermediate surface of the annular light guiding element. The first set of light sources may typically be controlled independently from the second set of light sources.

The first set of light sources and the second set of light sources may be arranged in a lighting module, wherein the first set of light sources may be arranged in a centre region of the lighting module aligned with the opening in the annular light guiding element, and the second set of light sources may be arranged in a circumferential region of the lighting module aligned with the first intermediate surface of the annular light guiding element. Furthermore, a separation wall may preferably be arranged between the circumferential region and the centre region of the lighting module to keep light from the first set of light sources and light from the second set of light sources separate. The lighting module may preferably have a closed bottom to ensure that any back-scattered light is reflected back into the light mixing module.

The first set of light sources may be configured to emit light having a first color spectrum, and the second set of light sources may be configured to emit light having a second color spectrum different from the first color spectrum. For example, the first set of light sources may be colored light emitting diodes (LEDs), and the second set of light sources may be white LEDs.

The luminaire may further include a light guide arrangement comprising: a first annular light guide arranged in a first plane and having an inner edge defining a cavity, and a peripheral edge; a second annular light guide arranged in a second plane parallel to the first plane and having an inner edge defining a cavity, and a peripheral edge, wherein the cavity of the first annular light guide is aligned with the cavity of the second annular light guide to form a compartment, wherein the light mixing module is arranged in the compartment in such a way that the annular light guiding element is arranged in the first plane, whereas the second annular light guide and the light sources are arranged on opposite sides of the first plane, wherein the luminaire further comprises a second reflective surface arranged such that the inner edge of the second annular light guide, the second intermediate surface of the annular light guiding element and the second reflective surface enclose a second mixing chamber, wherein the second reflective surface is configured in such a way that light that is coupled out through the second intermediate surface of the annular light guiding is mixed in the second mixing chamber, and coupled into the second annular light guide via its inner edge, wherein the light guide arrangement is configured such that light that is coupled out through the peripheral edge of the annular light guiding element is coupled into the first annular light guide via its inner edge, guided in a radial direction by means of total internal reflection, and coupled out through the peripheral edge of the first annular light guide, and wherein the second annular light guide is configured such that light that is coupled into the second annular light guide via its inner edge is guided in a radial direction by means of total internal reflection, and coupled out through the peripheral edge of the second annular light guide.

A shape and a size of the cavity of the first annular light guide may preferably essentially correspond to a shape and a size of the periphery of the annular light guiding element. This allows light that travels radially outward in the annular light guiding element to be coupled into the first annular light guide while minimizing losses at the interface. However, a material with a sufficiently low refractive index to ensure TIR inside the annular light guiding element, such as an air gap, preferably separates the inner edge of first annular light guide and the peripheral edge of the annular light guiding element.

The first annular light guide may be configured to couple out light towards the side of the luminaire where the light sources are arranged. Furthermore, the second annular light guide may be configured to couple out light away from the side of the luminaire where the light sources are arranged. Thus, an advantage with the light mixing module is that it enables a luminaire that may provide white task light directed downwards and colored atmosphere light directed upwards, while the lighting module can be arranged above the light guide arrangement for optimal cooling and while the colored LEDs can be arranged in the centre region of the lighting module to allow for enhanced color mixing. The enhanced color mixing means that a uniform color can be achieved also with a small number of colored LEDs, thereby providing a cost efficient solution.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIG. 1 is a perspective view of a luminaire comprising a light mixing module according to an embodiment of the invention;

FIG. 2 is a cross-sectional view schematically illustrating the operation of the luminaire in FIG. 1;

DETAILED DESCRIPTION OF THE EMBODIMENTS

Figure 3:
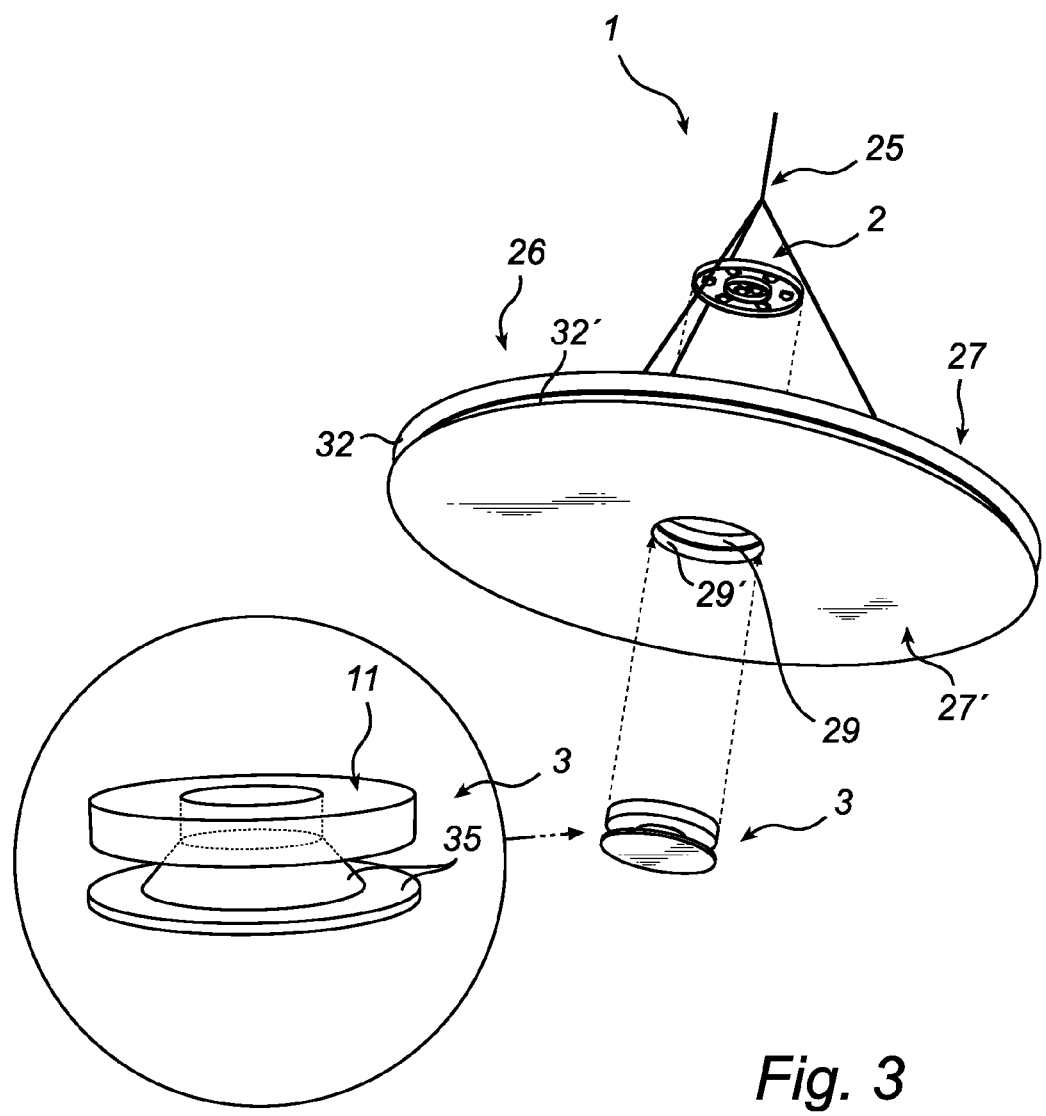
FIG. 3 is a perspective view of a luminaire where the light mixing module in FIG. 1 is combined with a light guide arrangement to provide a dual function lamp.

A light mixing module according to an embodiment of the invention will now be described with reference to FIG. 1 and FIG. 2.

FIG. 1 schematically illustrates a luminaire 1 comprising a lighting module 2 and a light mixing module 3. The lighting module 2 comprises a first set of light source 4 and a second set of light source 5. Here, the first set of light sources 4 are three colored LEDs (one red, one green and one blue) arranged in a centre region 6 of a printed circuit board (PCB) provided in the lighting module, whereas the second set of light source 5 are six white LEDs distributed across a circumferential region 7 of the PCB enclosing the centre region 6. However, as is recognized by a person skilled in the art, the number of LEDs and the colors of the LEDs may vary due to the illumination desired. The LEDs are connected to and powered by a conventional power source (not shown). A heat sink (not shown) may be arranged to dissipate heat generated by the LEDs. The lighting module preferably has a separation wall 9 arranged between the centre region 6 and the circumferential region 7 such that the colored light can be kept separate from the white light. There may also be an outer wall 8 arranged at the periphery of the circumferential region 7 to prevent leakage of white light.

The light mixing module 3 comprises an annular light guiding element 11 having an inner edge 13 defining a cavity 18 with an opening facing the light sources 4,5, a peripheral edge 12, a first intermediate surface 15 extending between the inner and peripheral edges and facing the light sources, and a second intermediate surface 16 extending between the inner and peripheral edges opposite the first intermediate surface 15. The annular light guiding element may preferably be transparent and can be made of e.g. glass or plastics, but can be made of any other material suitable for guiding light by total internal reflection. The refractive index of the annular light guiding element is here assumed to be 1.5. The medium surrounding the annular light guiding element is here assumed to be air, but other materials having a sufficiently low refractive index to guarantee total internal reflection may also be utilized such as a gel or cladding material known from optical fibers. In this embodiment, the annular light guiding element is circularly symmetric about its longitudinal axis. Furthermore, adjacent surfaces of the annular light guiding element are arranged at a right angle such that the annular light guiding element forms a cylindrical disk with a cylindrical cavity 18.

The annular light guiding element is arranged such that the opening of the cavity 18 is aligned with the centre region 6 of the lighting module, whereas the first intermediate surface 15 is aligned with the circumferential region 7 of the lighting module. The light mixing module further comprises a first reflective surface 17 arranged to close the cavity in an end opposite the opening so as to form a first mixing chamber 18.

As the lighting module 2 is arranged on top of the light mixing module, the separation wall 9 and the bottom surface of the lighting module will close the mixing chamber 18 and prevent leakage of the colored light. Thus, light from the colored LEDs 4 can only exit the mixing chamber 18 via the inner edge 13 of the annular light guiding element. To reduce the average number of reflections that are needed in the mixing chamber before the light can escape to the annular light guiding element 11, and thus to reduce absorption of light, the annular light guiding element may preferably have a depth (i.e. an axial extension) such that the inner edge 13 of the annular light guiding element covers an area at least comparable in size to the area covered by the first reflective surface 17. The first reflective surface 17 is here a flat plate of white plastic, but other (semi) specular reflective materials may also be used, such as a MIRO plate from the company Alanod.

The operation of the light mixing module will now be described with reference to FIG. 2, where the light emitted by the colored LEDs 4 and the white LEDs 5 are schematically illustrated by exemplary ray traces 22 and 23, respectively.

In operation, light 22 from the colored LEDs 4 enters the cavity 18 in the annular light guiding element via its opening. The light is then mixed in the mixing chamber 18 and coupled into the annular light guiding element 11 through its inner edge 13. The in-coupled light is then guided in a radial direction through the annular light guiding element 11 by means of total internal reflection and coupled out through the peripheral edge 12. Further, light 23 from the white LEDs 5 is in-coupled through the first intermediate surface 15 of the annular light guiding element. The in-coupled light is then guided through the light guiding element by means of total internal reflection and coupled out through the second intermediate surface 16.

It should be noted that, since the light 22,23 is bent to the normal of the entrance surface when entering the annular light guiding element (according to Snell's law) all light will be within a cone of 42 degrees to this normal (for a refractive index of 1.5). This means that all perpendicular surfaces will give an angle of incidence larger than the critical angle for total internal reflection (TIR). Thus, the colored light 22 that enters the annular light guiding element via the inner edge 13 cannot exit via the perpendicularly oriented first 15 and second 16 intermediate surfaces, but can only go to the peripheral edge 12. Similarly, the white light 23 cannot enter the first mixing chamber 18, but can only go to the second intermediate surface 16.

Figure 4:
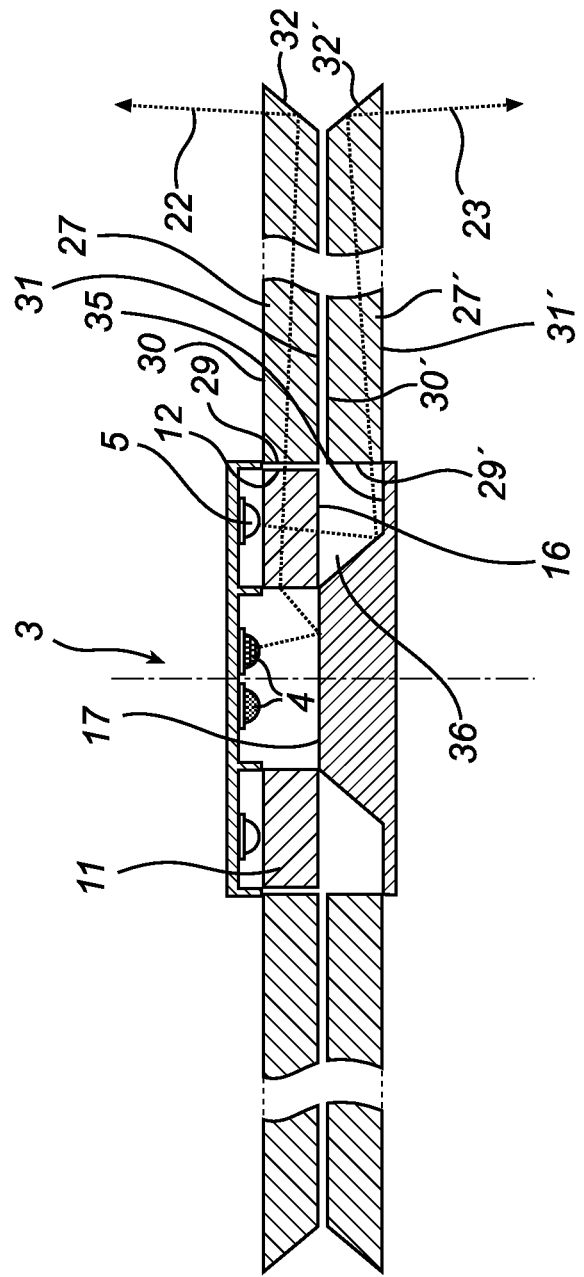
FIG. 4 is a cross-sectional view schematically illustrating the operation of the luminaire in FIG. 3.

FIGS. 3 and 4 schematically illustrate a dual function lamp or luminaire for lighting up a room, for example in an office, apartment, shop or other public area. The luminaire 1 here has a hang-up device 25 that hangs the luminaire to a ceiling (not shown). The luminaire includes the light mixing module 3 and the lighting module 2 described above in relation to FIGS. 1 and 2. The luminaire further comprises a light guide arrangement 26 arranged to receive light output by the light mixing module 3.

The light guide arrangement 26 comprises a first (upper) annular light guide 27, placed on top of a second (lower) annular light guide 27', but separated by a suitable medium so that light is allowed to travel inside the respective light guides 27, 27' via total internal reflection (TIR). The upper and lower light guides may preferably be transparent and can be made of e.g. glass or plastics, but can be made of any other material suitable for guiding light by total internal reflection.

The upper light guide 27 is here a circular cylindrical disk with a circular cylindrical cavity (or hole) arranged at the centre of the disk. An inner edge 29 of the upper light guide 27 defines the previously described cavity, which is here a through-hole. The inner edge 29 of the upper light guide is preferably essentially perpendicular to a (top) surface 30 and a (bottom) surface 31 of the upper light guide 27 to allow light to be coupled into the upper light guide 27 in a radial direction. A peripheral edge 32 of the upper light guide 27 preferably has a slanted surface in relation to the top surface 30 and the bottom surface 31 of the upper light guide 27 to couple out light in a desired direction. The slanted surface of the peripheral edge 32 of the upper light guide is here configured, in a conventional manner, to couple out the light in an upward direction.

The design of the lower light guide 27' is consistent with the upper light guide, with the exception that the slanted surface of the peripheral edge 32' of the lower light guide is here configured to couple out the light in a downward direction. Further, the reference numerals used for the lower light guide are the same reference numerals as are used for the upper light guide but with a prime sign (').

The cavity of the upper light guide is aligned with the cavity of the lower light guide to form a compartment for accommodating the light mixing module 3.

The light mixing module 3 is arranged in the compartment in such a way that the annular light guiding element 11 is arranged in the same plane as the upper light guide 27, with the lighting module 2 located above the light guide arrangement 26. The diameter of the cavity in the upper light guide 27 is selected such that the peripheral edge 12 of the annular light guiding element 11 is separated from the inner edge 29 of the upper annular light guide by an air slit. This prevents the white light 23 from the white LEDs 5 to be coupled into the upper annular light guide 27. Furthermore, to improve the mixing of the colored light 22, the air slit may contain a diffuser foil (not shown), e.g. a holographic diffuser foil from the company Luminit. Further, it should be noted that the refractive indices of the annular light guiding element 11 and the upper 27 light guide need not be the same, although they may be.

The luminaire further comprises a second reflective surface 35 arranged such that the inner edge 29' of the second annular light guide, the second intermediate surface 16 of the annular light guiding element and second reflective surface 35 enclose a second mixing chamber 36. In the illustrated embodiment, the first 15 and second 16 reflective surfaces has been formed by arranging a cap beneath the annular light guiding element 11. The cap can be made of white plastic and be e.g. injection molded. The cap may also be made of (semi) specular reflective material, such as bent MIRO plates from the company Alanod.

The operation of the luminaire where the light mixing module is combined with the light guide arrangement will now be described with reference to FIG. 4. The light emitted by the colored LEDs 4 and the white LEDs 5 are schematically illustrated by exemplary ray traces 22 and 23, respectively.

In operation, colored light 22 is coupled out through the peripheral edge 12 of the annular light guiding element 11 as previously described in relation to FIG. 2. This light is then coupled into the upper annular light guide 27 via its inner edge 29. The in-coupled light is then guided inside the upper annular light guide 27 in a radial direction by means of total internal reflection, and coupled out through the peripheral edge 32 in an upward direction to provide colored atmosphere light directed upwards.

Further, white light 23 is coupled out through the second intermediate surface 16 of the annular light guiding element 11 as previously described in relation to FIG. 2. This light is then mixed in the second mixing chamber 36 and coupled into the lower annular light guide 27' via its inner edge 29'. The in-coupled light is then guided inside the lower annular light guide 27' in a radial direction by means of total internal reflection, and coupled out through the peripheral edge 32' of the second annular light guide 27' in a downward direction to provide white task light directed downwards. It should be noted that, since the second intermediate surface 16 of the annular light guiding element is here perpendicular to the inner 13 and peripheral 12 edge of the annular light guiding element, any back-scattered light from the second reflective surface 35 or from the second annular light guide 27', may go back to the white LEDs 5 where it is reflected by the bottom surface of the lighting module (2), but the white light cannot go to the colored LEDs 4 due to TIR.

In the above described luminaires, the mixing of the light from the colored LEDs 4 in the first mixing chamber 18 promotes a uniform color distribution of the colored light 22. However, if required, any color variations may be further reduced by adding a diffuser at the inner edge 13 of the annular light guiding element 11. Alternatively, the peripheral edge 12 of the annular light guiding element 11 and/or the inner edge 29 of the upper light guide 27 may contain groove structures in the axial direction (or lenticular structures in the axial direction) to enhance the mixing effect. It should be noted that grooves along the axial directions do not interfere with the TIR guiding for light travelling along this axial direction. Furthermore, due to the mixing of light from the white LEDs 5 in the second mixing chamber 36, the luminaire in FIGS. 3 and 4, can provide a uniform illuminance distribution for the white light 23. Moreover, if desired, the beam width of the light may be broadened by applying diffusers at the peripheral edge 32,32' of the upper 27 and/or lower 27' light guides.

Moreover, for improving the mixing of the white light, diffuser foils may be arranged in front of the first intermediate surface 15 and/or the second intermediate surface 16, or radially extending grooves or lenticulars may be provided in the first intermediate surface 15 and/or second 16 intermediate surface. Like the axial grooves in the peripheral edge 12 and inner edge 13, these radial grooves extend along the main direction of the light guided by TIR, and therefore does not break up the TIR. The groove facets or lenticular facets do help in spreading the light by refraction at the facets.

According to an exemplifying embodiment, the annular light guiding element may have an inner radius of 17.5 mm, an outer radius of 24.3 mm, and a height 5.0 mm. The annular light guides may have an inner radius of 25 mm, an outer radius of 150 mm, and a height of 5.0 mm (for each of the two light guides).

The person skilled in the art realizes that the present invention by no means is limited to the preferred embodiments described above. On the contrary, many modifications and variations are possible within the scope of the appended claims. For example, instead of using the above described light guide arrangement, the light mixing module may be combined with other optical elements, such as light guide optics and/or reflector optics. Thus, light that is coupled out through the peripheral edge of the annular light guiding element may enter a first optical system, whereas light that is coupled out through the second intermediate surface of the annular light guiding element may enter a second optical system, where the first and second systems may create different effects (e.g. up/down, or broad/narrow beams).

For instance, a downward (white) beam can be made with a conventional parabolic reflector, and an upward (colored) light can be made with another parabolic reflector or a (semi) specular reflector that produces a wider beam.

The invention claimed is:

1. A light mixing module for receiving light from a first set of light sources and a second set of light sources, said light mixing module comprising:
    an annular light guiding element, said annular light guiding element having an inner edge, a peripheral edge, a first intermediate surface extending between said inner and peripheral edges and arranged to face said light sources, and a second intermediate surface extending between said inner and peripheral edges opposite said first intermediate surface, wherein said inner edge defines a cavity with an opening arranged to face said light sources, wherein said opening is arranged to receive light from said first set of light sources and said first intermediate surface is arranged to receive light from said second set of light sources; and
    a first reflective surface arranged to close said cavity in an end opposite said opening so as to form a first mixing chamber,
    wherein said annular light guiding element and said first reflective surface is arranged in such a way that light entering via said opening is mixed in said first mixing chamber, coupled into said annular light guiding element through said inner edge, guided through the annular light guiding element in a radial direction by means of total internal reflection and coupled out through the peripheral edge, and light received by said first intermediate surface is guided through said light guiding element by means of total internal reflection and out-coupled through said second intermediate surface.

2. A light mixing module according to claim 1, wherein the inner edge of the annular light guiding element is essentially perpendicular to the first intermediate surface of the annular light guiding element and to the second intermediate surface of the annular light guiding element.

3. A light mixing module according to claim 1, wherein said first intermediate surface is essentially perpendicular to the inner edge of the annular light guiding element and to the peripheral edge of the annular light guiding element.

4. A light mixing module according to claim 1, wherein at least one of the surfaces of the annular light guiding element is provided with diffusing means.

5. A light mixing module according to claim 1, wherein an area of the inner edge of the annular light guiding element is at least as large as an area of the first reflective surface.

6. A light mixing module according to claim 1, wherein the annular light guiding element is circular symmetric about its longitudinal axis.

7. A luminaire comprising:
    the light mixing module according to claim 1;
    the first set of light sources arranged to emit light that is received by the opening in the annular light guiding element; and
    the second set of light sources arranged to emit light that is received by the first intermediate surface of the annular light guiding element.

8. A luminaire according to claim 7, wherein said first set of light sources and said second set of light sources are arranged in a lighting module, wherein said first set of light sources is arranged in a centre region of said lighting module aligned with the opening of the annular light guiding element, and said second set of light sources is arranged in a circumferential region of said lighting module aligned with the first intermediate surface of the annular light guiding element.

9. A luminaire according to claim 7, wherein the first set of light sources is configured to emit light having a first color spectrum, and the second set of light sources is configured to emit light having a second color spectrum different from the first color spectrum.

10. A luminaire according to claim 7, further comprising a light guide arrangement comprising:
    a first annular light guide arranged in a first plane and having an inner edge defining a cavity, and a peripheral edge;
    a second annular light guide arranged in a second plane parallel to said first plane and having an inner edge defining a cavity, and a peripheral edge, wherein the cavity of the first annular light guide is aligned with the cavity of the second annular light guide to form a compartment,
    wherein the light mixing module is arranged in said compartment in such a way that the annular light guiding element is arranged in said first plane, whereas the second annular light guide and the light sources are arranged on opposite sides of said first plane,
    wherein said luminaire further comprises a second reflective surface arranged such that the inner edge of the second annular light guide, the second intermediate surface of the annular light guiding element and the second reflective surface enclose a second mixing chamber, wherein the second reflective is configured in such a way that light that is coupled out through said second intermediate surface of the annular light guiding element is mixed in said second mixing chamber, and coupled into the second annular light guide via its inner edge;
    wherein the light guide arrangement is configured such that light that is coupled out through the peripheral edge of the annular light guiding element is coupled into the first annular light guide via its inner edge, guided in a radial direction by means of total internal reflection, and coupled out through the peripheral edge of the first annular light guide, and wherein said second annular light guide is configured such that light that is coupled into the second annular light guide via its inner edge is guided in a radial direction by means of total internal reflection, and coupled out through the peripheral edge of the second annular light guide.

11. A luminaire according to claim 10, wherein a shape and a size of the cavity of the first annular light guide essentially corresponds to a shape and a size of the periphery of the annular light guiding element.

12. A luminaire according to claim 10, wherein the first annular light guide is configured to couple out light towards a side of the luminaire where the light sources are arranged.

13. A light guide arrangement according to claim 10, wherein the second annular light guide is configured to couple out light away from a side of the luminaire where the light sources are arranged.

* * * * *